United States Patent [19]
Yananton

[11] Patent Number: 5,359,960
[45] Date of Patent: Nov. 1, 1994

[54] DIAGNOSTIC SYSTEM FOR USE WITH SMALL ANIMALS

[76] Inventor: Patrick Yananton, 160 Palo De Oro Dr., Islamorada, Fla. 33036

[21] Appl. No.: 669,674

[22] Filed: Mar. 14, 1991

Related U.S. Application Data

[63] Continuation of Ser. No. 303,136, Jan. 30, 1989, abandoned, which is a continuation-in-part of Ser. No. 236,675, Mar. 26, 1988, abandoned, and a continuation-in-part of Ser. No. 224,944, Jun. 27, 1988, Pat. No. 5,025,752, which is a continuation of Ser. No. 885,932, Jul. 15, 1986, abandoned.

[51] Int. Cl.$^5$ .............................................. A01K 45/00
[52] U.S. Cl. .................................................... 119/165
[58] Field of Search ............. 128/760; 119/1, 165–170

[56] References Cited

U.S. PATENT DOCUMENTS 3,978,818  9/1976  Heldenbrand ........................... 119/1
4,444,148  4/1984  Lander ................................... 119/165
4,640,225  2/1987  Yananton ............................... 119/1

Primary Examiner—Max Hindenburg
Attorney, Agent, or Firm—Malloy & Malloy

[57] ABSTRACT

The invention relates to a diagnostic system for testing animal urine and includes a device for the collection of the urine. The system uses granular particles which are nonabsorbent particles having sufficiently large diameter to provide sufficient interparticle spacing to permit free flow of urine from the particles to the collection region below. The base of the litter box can serve as the urine collector, but preferably, a moisture impermeable liner provides this function. In the use of the instant device for diagnostic purposes, the urine is allowed to pass through the grit, due to its non absorbency, into collection areas. Early evidence of many diseases can be detected, as well as the monitoring of ongoing treatment, through urine analysis. The grit can be used in combination with waffle type support inserts, plastic liners or a spacer member.

15 Claims, 1 Drawing Sheet

DIAGNOSTIC SYSTEM FOR USE WITH SMALL ANIMALS

Cross-Reference to related patent applications

This application is a continuation of now abandoned Application Ser. No. 07/303,136 filed Jan. 30, 1989, which is a continuation-in-part of now abandoned Application Ser. No. 07/236,675 filed Mar. 26, 1988, and is a continuation-in-part of U.S. Pat. No. 5,025,752 filed Jun. 27, 1988 and having Ser. No. 07/224,944, which is a continuation of now abandoned Application Ser. No. 06/885,932 filed Jul. 15, 1986.

BACKGROUND OF THE INVENTION

1. Field of the Invention

This invention relates to a diagnostic system to be used to collect urine specimens from small animals, especially cats and to a specific nonabsorbent litter for use in combination with the diagnostic system. In particular, the litter can be a mineral particle, such as coarse sand, and the diagnostic system can be a disposable, nonabsorbent, urine retention system.

2. Brief Description of the Prior Art

Certain disease states become obvious in many cats only after clinical symptoms have finally manifested themselves in the cat's physical appearance or behavior. By that time the disease can progress to such an extent that extensive treatment is required and a cure is difficult, if not impossible, to achieve. Long term involved treatment not only represents a financial burden for the owner who may or may not wish to carry this burden but also involves increased suffering for the cat.

Approximately 100,000 cats are afflicted with FUS every year; a lesser number of cats develop diabetes every year. The current number of FUS and diabetics cats is unknown. FUS cats require a minimum of one test per week, while diabetic cats should be tested daily for the rest of their lives; FUS cats should be monitored frequently even after their condition is cleared up. In 1985 approximately 10% of the income for a vet who treated felines was attributable to cats with urinary tract-associated disorders.

Urinanalysis involves studying the urine for various chemical, biochemical, microbiological, cellular and parasitological data that can indicate normal or diseased states not only of the kidneys, bladder, and ureters but for other parts of the body as well. Analysis of the urine yields a great deal of information quickly and economically. The use of simple tests such as those for proteinuria, glucose and the examination of the urinary sediment will provide the physician with helpful information concerning the diagnosis and management of renal disease, urinary tract disease and many systemic diseases.

Concomitant with this is the fact that many younger male cats are being afflicted by FUS (Feline Urinary Syndrome) whereby mineral crystals and stones can cause severe blockage and irritation to the urinary tract. Many female cats are susceptible to urinary tract infections and older cats can suffer from a variety of urinary tract disorders ranging from tumors of the bladder and kidney to various types of nephritis.

Other types of metabolic disturbances such as diabetes can be detected and monitored by examining the urine for glucose. Many diabetic cats should be monitored daily for their urine glucose levels to see if the medication being administered is working at proper levels and food intake levels are adequate.

The presence of blood in a cat's urine should signal an immediate visit to the vet if detected (other than a female cat in heat). With the introduction of simple techniques in which reagent strips and tablets are used, tests that previously required more complex chemical analysis may now be accomplished with ease.

Proteinuria is probably the most common indicator of renal disease. It is, for example, an early indicator of latent glomerulonephritis, toxemia of pregnancy and diabetic nephropathy. The finding of proteinuria may strongly suggest the presence of renal disease as opposed to lower urinary tract disease. When considered with the clinical findings, confirmation of the presence of renal disease can be made by finding casts in the microscopic examination of the urine sediment.

Microscopic examination of the sediment in a properly collected sample of urine may not only provide evidence of renal disease but may also indicate the kind of lesion present or the state of activity of a known lesion. It should be included in every complete medical examination because it provides important information concerning the kidneys and urinary tract not readily obtainable in any other way.

Detection of the early appearance of blood, high bacterial count, albumen, glucose or ketones in a cat's urine would signify an immediate visit to a veterinarian. Bringing along a fresh urine sample would allow the vet to conveniently run his own rapid tests. Early treatment and resultant cure could prevent any long term complications. Suffering by the silent animal can be minimized as well as the pet owner's concerns.

For those cat owners who own a cat already having urinary tract problems or diabetes, the collection of a urine sample is a must for monitoring the state of the animal's health and for administering proper medication and diet, at proper levels. Persistence of blood or occult blood in the urine could signify an antibiotic that is not affecting a urinary tract infection or could mean persistent diseased kidney involvement, tumors, etc.

Cats developing urinary tract disease due to stones, tumors, viral or bacterial infections will leak blood into their urine a large percentage of time. The pink to orange stained urine can easily be seen on the white absorbent pad when used in combination with the nonabsorbent litter of the instant disclosure, whereas it is not at all visible in ordinary absorbent litter.

Collection of urine from a cat by the average homeowner or veterinarian can be an extremely difficult and trying task. Most veterinarians would gladly welcome a cat owner into their office who brings with him a "freshly voided" specimen. Many vets try to force a urine specimen from an outpatient cat by manipulation. Other than caging the animal with a tray specifically designed for collecting urine or catheterizing the animal, cat urine collection is a very difficult task. Due to this difficulty collection of a clean urine specimen at home or in a vet's office has been severely limited or neglected.

Because of the difficulty in obtaining a specimen, routine urine screening of the general feline population is not performed. Obtaining a urine specimen is primarily limited to those felines suspected of, or already exhibiting, clinical symptoms or having a history of urological disease. In the case of diabetes, daily, or at least weekly testing, should continue for the life of the cat. However, such monitoring of felines with active diabetes or feline urological syndrome is not practiced by the general public because of the laborious, tedious nature of the task. Consequently, most feline owners resort to euthanasia after just a few weeks of attempting to regulate the health of the afflicted feline.

SUMMARY OF THE INVENTION

It has now been found that the problems of the prior art have been overcome through the use of a novel urine diagnostic system and diagnostic procedure. The urine diagnostic device includes the combination of a receptacle member and a urine collection member. The urine collection member is positioned on the receptacle member, and at least substantially completely covers the receptacle member. The urine collection member includes a claw proof sheet and a moisture impermeable film. Preferably, a spacer element is provided between the claw proof member and the moisture impermeable member and serves as a urine collection region. The spacer member is preferably made of a high loft, nonwoven, bonded fiber fabric. In one embodiment of the invention, the claw proof member functions as both a urine collection region as well as claw proof protection for the moisture impermeable film.

In order to attract the cat to the system and to indicate to the cat the function of the device, a litter must be used. The litter is used in the common manner as the uppermost layer in a litter box. Thus, the litter overlies the claw proof member and is made of substantially non-absorbent particles. The particles, have an average particle size of at least sufficiently large diameter to provide sufficient interparticle spacing to permit free flow of urine from the particles to the diagnostic member. Further, the non-absorbent particles are substantially free of particles having a size such that the particles fill the spaces between adjacent non-absorbent particles and consequently inhibit liquid flow between adjacent litter particles. Thus, the urine is as unrestricted as possible in its' flow through the litter and the claw proof member for collected on the moisture impermeable member. Preferably, the litter is mineral particles having a specific gravity on the order of about 2.

The litter can be a coarse sand or other mineral having an average particle size greater than about one millimeter and a specific gravity of at least 1.5. Preferable, the particle size is no greater than about three centimeters in order to be comfortable for use by the cat. The specific gravity typically is up to about 2.5, based on the desire to avoid unnecessarily heavy particles which are expensive to transport and the availability of natural materials.

The particles are of sufficient size, density and hydrophobicity to resist wetting by urine and clinging to the feet of animals, and to provide for essentially unrestricted flow of urine past the particles. The size criticality is based on the need to permit free flow of liquid and the weight is based on the need to prevent scattering of the particles and the clinging of the particles to the feet of the cat. The mineral particles can have an average particle size in the range from about two millimeters to about one centimeter, an average weight of at least about 100 pounds per cubic foot and must be substantially free of friable particles in order to avoid clogging of the liquid flow passages. Advantageously, the particles can have a hydrophobic coating in order to increase the nonabsorbancy and to minimize the tendency to cling.

The granular particles must be chemically inert with respect to the test reagents. By the term "inert", as used herein, is meant the freedom from chemically active ingredients which interfere with the diagnostic tests by influencing the test result. An inert component does not impart any acidity or alkalinity or other chemicals to the system which could produce, or induce, false negatives or positives. It is essential that all components which come into contact with the urine be inert, as defined herein. The use of a hydrophobic coating on the granular particles not only decreases the absorbency of the granular particles, but also, can increase the chemical inertness of the particles. It should be understood that the inert characteristics are equally true for the claw proof element, the spacer and the impermeable member, and any other component which comes into contact with the urine.

If the system is rendered sterile, as by exposure to gamma radiation, microbiological tests can be conducted using the system. Thus, where a cat that is exhibiting symtoms of an infection, urine can be collected for qualitative testing. The tests would be subject to contamination from the fur of the animal, but typically would be free of bacteria which are associated with urine infections. The system would thus be of value when used by one skilled in the field of microbiological testing.

In another embodiment, the urine collection member is a disposable, liquid impermeable receptacle, and the particles are contained in the disposable receptacle. A claw proof member and spacer element can also be provided. The receptacle can function as the liquid impermeable member or a moisture impermeable film member can be used. The film is preferably a disposable polymeric film, such as polyethylene, polyvinylchloride or polyurethane.

In the method of the present invention, a diagnostic test is conducted on animal urine. The method includes collecting urine in urine collection device which can include a receptacle, a spacer member, a claw proof member, urine impermeable film, and nonabsorbent particles. The spacer member is between the claw proof member and the urine impermeable film. In one embodiment of the invention, the claw proof member and the spacer is combined as one unit. The nonabsorbent particles overlie the claw proof member.

The steps of the method include transferring cat urine directly from granular particles, through the claw proof member, through the spacer member to the urine impermeable member. Urine is collected on the urine impermeable member and then a specimen is separated from the collected urine. The testing of the specimen advantageously involves contacting the specimen with a diagnostic test material in the form of a test strip having a muliplicity of diagnostic test indicators.

In another embodiment, the urine impermeable film with collected urine from the receptacle, is lifted from the receptacle and the specimen from is separated from the collected urine by pouring urine from the film or puncturing the film in order to achieve the desired separation.

BRIEF DESCRIPTION OF THE DRAWINGS

The advantages and objects of the invention will become apparent and the invention will be more fully understood from the following specification, particularly when read in conjunction with the drawings, wherein.

DETAILED DESCRIPTION OF THE INVENTION

Figure 1:
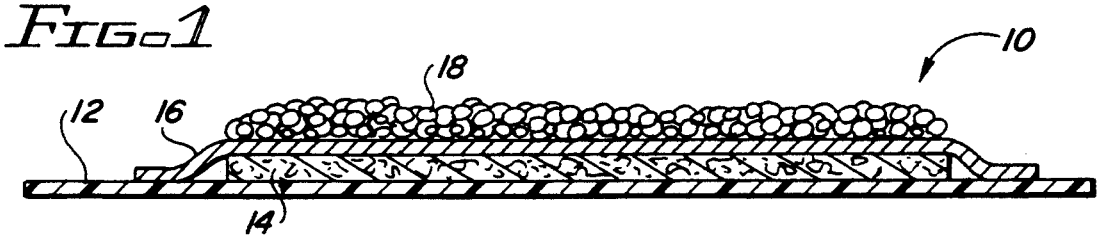
FIG. 1 is an exploded fragmentary view of the diagnostic pad in accordance with the present invention.

The system of the present invention can be used to collect the freshly voided urine specimen in familiar surroundings of the feline's home, without the use of expensive equipment, or can be used in the vetinarians office, in an atmosphere familiar to a cat since it resembles a conventional litter box. In its' simplest form, it includes a nonabsorbent litter contained within a receptacle. For convenience, the litter can be initially contained in a bag which is opened or unfolded to expose the litter and refolded to provide for ease of disposal of the litter after usage of the system in a urine diagnostic procedure.

In a further embodiment, a urine collection device can be provided which includes the nonabsorbent litter, a claw proof screen, a spacer and a urine impermeable member, all of which can be placed in a standard cat litter receptacle. In this embodiment, the receptacle does not have to be sterile since it does not come into contact with the urine.

In another embodiment, the receptacle and the urine impermeable member are combined as one integrated, disposable unit. The spacer serves the function of keeping the feet of the cat away from the urine after the cat void, in order to avoid contamination of the specimen. Since it is desirable that the receptacle be clean, and advantageously sterile a disposable receptacle provides desirable advantages.

In a preferred embodiment, a sterile three-layer system is employed. The three layer system includes a claw proof screen, a spacer and a moisture impermeable membrane. The system and a nonabsorbent, chemically inert litter, are placed in a standard litter box. Nonabsorbent mineral particles allow for the rapid entrance of the cat urine into the diagnostic pad with minimal absorption. The cat urine is transferred directly from overlying litter particles, through a cat claw resistant screen into a nonabsorbent spacer member of inert, self-supporting material and is collected on the liquid impervious bottom sheet. The liquid impervious bottom sheet can be secured to the litter box by means of the self-contained adhesive strips.

Immediate testing can be performed or the entire liner can be folded and stored in the refrigerator for later transportation to the veterinarian's office where more than ten tests can be performed within a few minutes using commercially available dipsticks. People wishing to monitor their cats on a routine basis can be supplied with the instant invention in combination with the appropriate dipsticks.

Collection of the urine specimen involves lifting the system from the litter box, piercing the center of the liquid impervious sheet and collecting the urine in a specimen cup or delivering the urine directly onto a dipstick.

A test device for detecting the presence of constituents in a liquid test sample, and method of preparation are disclosed in U.S. Pat. No. 4,301,115. The patent discusses the advancement of analytical chemistry and the popularity of the dip sticks.

U.S. Pat. No. 3,438,737 discloses a test composition, device and method for detecting protein in fluids comprising a pH chromogenic indicator material exhibiting protein error. The patent discloses the need for rapid, accurate test results.

Additional methods of improving the accuracy, ease and rapidity of testing results from body fluids are disclosed in U.S. Pat. Nos. 4,147,514, 4,038,031, 3,814,668, 3,585,001 and 3,986,833.

In order to provide a clear understanding of the instant invention, the various aspects of the invention are hereinafter described in detail.

CLAW RESISTANT SCREEN

The diagnostic pad structure of the instant invention includes a protective screening and a moisture impermeable liner. A protective screening is fully disclosed in U.S. Pat. No. 4,640,225, issued Feb. 3, 1987, the disclosure of which is incorporated herein by reference thereto, as though disclosed herein in detail. The screen must be capable of withstanding the clawing action of an animal such as a cat, to protect the bottom layers. The amount of exposure to the cat's claws is extremely limited in a diagnostic system and therefore the weight of the protective screening is not a critical factor and the weight and strength factors disclosed in the aforenoted patent can be reduced.

Other inert protective means can be used, preferably flexible, however they must meet the criteria set forth below. The holes in the screen are sized small enough to prevent the animal's claws from reaching the underlying layers, while numerous and large enough to allow for rapid passage liquids. The screen is sealed to a moisture impermeable material along at least a substantial portion of their peripheral edges. A plastic film, such as polyethylene or polyurethane, or other inexpensive material can be used.

GRANULAR MATERIAL

The granular material as employed in the instant invention is utilized to satisfy the digging instinct of the animal and should not provide absorptive qualities. Consequently, inexpensive nonabsorbent materials such as mineral particles such as small pebbles, rocks, stones gravel, coarse sand and the like, previously unsuitable as a cat litter material because of the lack of absorbency or ability to hold urine that pools in the bottom of the litter box can now be used as a more effective cat litter box filler when used with diagnostic pads.

Sand is a well known medium for use as cat litter. Sand particles, such as used on construction and children's sandboxes, do not absorb the urine in the manner that clay and other commercial litters absorb and hold large quantities of urine. In the case of sand, the urine appears to be held by surface tension within the densely packed material. Consequently, common sand can not be used with the present invention and coarse or large size particles is critical to the proper operation of the invention.

In contradistinction to the flow of liquid in sand, the more numerous air spaces between the larger particles in coarse mineral grit gives it an inherent ability to allow urine to rapidly drain into the collection region without impeding the flow or spread of the urine through out the pad. Very fine particle such as fine sand or soil, will not act as good cat box filler because the flow of urine into the pad is impeded by the numerous, closely packed particles.

Unlike the commonly employed systems in which the granular material must be used in sufficient quantity to provide the required absorptive qualities and digging qualities, minimal quantities of the granular material can be used, as described herein, and sorbtion must be avoided.

Hence, proper sized nonabsorbent mineral particle cat box filler serves the function of;
1. providing an attractive digging medium for cats;
2. allowing cat urine to fall rapidly over the particles into the diagnostic pad;
3. preventing scatter out of the litter box less than light weight clays and similar absorbent litters due to the density of the mineral particles;
4. Litter is sufficiently inert such that it does not impart any contaminants to the urine which can affect the tests found on a commonly used dip stick, and
5. producing less dust than clay, when washed and not being friable, therefor creating no dust of its own, allowing for cleaner specimens for testing.

The use of a surfactant on the screen material can enhance the moisture transfer capability of the screen and is essential in combination with hydrophobic or low hydrophilicity screen materials. The selection of the surfactant must be such that it is chemically inert with respect to the urine and the reagents of the diagnostic tests. The quality of being chemically inert with respect to the diagnostice reagents is true for all elements of the system which come into contact with the urine.

The particle size distribution can range from a few millimeters to several centimeters. Common fine sand having a particle size at the lower end of sands, that is at the 200 mesh (0.074 mm.) size, pack so densely as to limit or restrict liquid flow between the particles. At the upper end of the particle size the sand or gravel material can be rejected by the cats.

While reference has been made in particular to grit, it should be understood that nonabosorbent materials, in particular other inorganic minerals, in general will provide similar results.

Particularly suited to the instant invention is a coarse sand referred to as fine gravel commonly found in central New Jersey. These gravels and sands were deposited during the formation of the early coastal plain. The grit is mined from beds that can be from glacial, riverbed or ocean basin origin. The sands and gravels consist mostly of quartz or silica. The available particles are found in a wide range of particle sizes and must be sieved to obtain the desired particle size distribution. The nonabsorbent particles must be sufficiently free of friable materials, such as clay, in order to avoid the filling of the interstices. The particles can be as small as one millimeter in diameter and as large as three centimeters. The preferred range, however, is between two millimeters and about one centimeter. It should be understood that the particles typically are not round, but rather, most typically are oval or irregular in shape and the diameter referred to is the average diameter of the particle. The particles are washed to get rid of the small dust particles and then air or oven dried prior to use as a nonabsorbent litter.

Alternate litter materials include grits formed from crushed stone, limestone and other naturally occurring reactive mineral systems. From an economic stand point, the optimum material is calcium carbonate, in the form of naturally occurring limestone.

For aesthetic effect, the particles can be dyed to a particular color. Mordant dyes can be used where the particles are silica. The particles can be coated to moderate the hydrophobicity or hydrophilicity of the surface of the particles. The use of waxes, silicons, and the like can be used in this regard.

The use of water repellent coatings enables the use of materials whose absorbency would other wise be too high for the instant application. The coating can be of the type disclosed in U.S. Pat. No. 3,562,153 (Tully et al, issued Feb. 9, 1971), the disclosure of which is incorporated herein, by reference. Although the aforenoted patent relates to an oil absorbent material, the disclosure is generally applicable in regard to the instant invention to the extent that it teaches the means for coating a particle to render the particle water repellent. It should be noted that the disclosure in the patent of relevant particles sizes is totally inapplicable to the present invention and the teaching of the instant disclosure must be followed. As noted in U.S. Pat. No. 3,562,153 the coating material can be an organosilicon compound, such as an organohalosilane, organosilylamines and organodisilazanes. Additionally, the coating process and materials can be in accordance with the teachings of U.S. Pat. No. 3,464,920 and 3,382,170, the disclosure of which is incorporated herein by reference.

The higher the hydrophobicity of the particles, the greater should be the particles size in order to prevent the water from hanging up above the particles. The thinner the layer of particles which is used, the finer the particles can be without the water being prevent from passing through the particles.

In order to ensure that cat urine cannot penetrate the micro-cracks and pores on the surface of each granule and possibly cause odor formation, interact with particles or be unavailable for testing, it has now been found that various water repellent and water-proofing agents can be used to prevent this occurrence. Also, each grit particle having water-repellent characteristics tends to cause the majority of the urine void to enter the urine collection region rather than cling to each particle or gather in the in spaces in between each particle.

A variety of compounds can be used to treat mineral grit particles so as to make them water-repellent or water-proof economically. Metallic stearates can be applied conveniently to mineral surfaces in a powder, liquid or suspension form. Various stearates such as aluminum, calcium or zinc can be used. The hydrophobic nature of specific metallic stearates enables them to inhibit capillary absorption of water. Hydrocarbon solvent solutions of Witco aluminum stearates are utilized for water-repellent application to surfaces. To enable good penetration, an aluminum stearate solution should be as fluid as possible and should be applied to dry hardened surfaces. Solutions of 2 to 10% by weight of Aluminum Stearate Non-Gel A are used for low viscosity spray-on or brush-on applications.

Dow Corning 772 Water Repellent is a nonflammable water soluble sodium methyl siliconate solution designed to impart water repeliency to a wide variety of surfaces. Supplied at a 30% solids in water, this water repellent is diluted to a concentration of 3% before being applied. The siliconate reacts with moisture and carbon dioxide in the air to form an insoluble water-resistant resin within 24 hours.

Dimethyl emulsions and other types of silicone fluids can be used to effectively seal off micropores and make the granules waterproof. Aqueous emulsions and solutions are desirable because they impart no odor to the granules. The process of application can be by tumbling, immersion, spraying or brushing. Usually about 80 ml. of silicone liquid is added per 50 pounds of grit, however, this concentration can be altered to thin or thicken the coating. Once coated, the Grit particles are allowed to dry. The coating process also aids the "dustless" characteristics of the mineral grit as small dust particles are adhered and coated to the larger mineral particles. Thus the coating process serves to wash the mineral grit as well as prevent the escape of any remaining particles.

| SIEVE SIZE | GRIT CHARACTERISTICS |
| --- | --- |
| Pass ⅜ but only 10-30% thru #4 0-10% - #8 | Large Pebbles: No scatter but not suitable for use as cat litter. Transmission rates acceptable |
| 85-100% pass #4 only 10-40% pass #8 | Proper size for cat litter. Minimum scatter or tracking. Dustless. Transmission rates acceptable |
| 085-100% pass #8 10-40% pass #16 | Transmission rates still acceptable Very small particles - still suitable for cat litter but trackless, scatterless properties now lost. |
| 80-100% pass #8 50-85% pass #16 25-60% pass #30 10-30% pass #50 | Particles too small to allow required transmission rates. |
| 2-10% pass #100 | Too much scattering. |

Although glass beads, Teflon coated particles, polypropylene or polyethylene, synthetic and natural resins can serve as the same function as nonabsorbent coarse sand or fine gravel, a large number of cats will reject the use of these products as a cat box filler. Moreover, such particles, due to their low density, float on the urine and are difficult to separate from the urine due to wetting of their surfaces by the urine. Very large particles such as large pebbles or gravel, rocks, etc., tend to be undesirably heavy and rejected by cats when used as a cat box filler. Digging is difficult with large heavy particles, thus contributing to rejection by cats.

Coase sand, by way of contrast, mimics the appearance of the commercially available absorbent clay litters and thus provides a familiar appearance to cats. Further, it is readily used by the cat for digging and as a waste matter repository and has the advantage of resisting scattering and tracking by the cat. In addition, the nonabsorbent granules are non-friable and dusting is consequently negated. This feature is critical in diagnostic applications because of the need to separate the urine from the cat litter material.

DIAGNOSTIC UNIT

FIG. 1 illustrates the three layers of the diagnostic pad 10:

1- A bottom, impervious sheet 12 made from polyethylene or polypropylene serves to catch and hold the urine which flows down from the upper spacing layer.

2- The middle layer or spacer 14 is constructed of a nonabsorbent material, such as a high loft, non-woven material, such as spray bonded high loft polyester, or other material that allows urine to pass through to the bottom impervious layer while providing support to the nonabsorbent grit digging medium above.

Examples of materials which would provide the required characteristics are those such as the spray bonded polyester sold by Union Wadding Inc.; thermobonded polyester, as sold by the Burnett Company; the non-woven fabrics sold by Stearns under the trademark Fabray as well as any other economical materials that have body, are inert to urine and allow the urine from the above ripproof layer to flow through and collect on the bottom polyethylene sheet.

The spacer 14 need only be about ⅛" to ¼" high and serves to prevent the weight of the cat and the nonabsorbent litter from pressing down and dispersing the urine specimen over a broad area or back up into the nonabsorbent litter.

3-A liquid transmitting, nonabsorbent, ripproof layer 16 covers and protects the space layer 14 and impervious sheet 12. The ripproof sheet 16 serves to prevent the cat from tearing into the spacing layer 14 with its claws and, most importantly, from tearing the moisture impermeable bottom sheet 12. It also serves to keep the nonabsorbent litter 18 from entering into and contaminating the urine specimen contained in the spacer layer 14. The rip proof layer 16, as described in U.S. Pat. No. 4,774,907, can be made of James River's spunbonded nylon sold under the trademark Cerex. The material weight can range from 0.5 to 1.0 oz. per sq. yard.

A nonabsorbent litter 18 layer is placed on the ripproof layer 16 of the diagnostic pad 10 to provide a digging medium for the cat. The nonabsorbent litter 18 can be made of plastic resin beads of any type plastic, glass, etc. The preferred material, however, for economic and functional reasons, is the nonabsorbent mineral grit particles as described in copending U.S. patent application Ser. No. 07/224,944, filed Jul. 27, 1988, which case is a continuation of 06/885,932, filed Jul. 15, 1986, the disclosures of which are incorporated by reference, as though set forth herein in detail. About ¼-inch deep of the nonabsorbent litter 18 sufficient to satisfy the cat's digging urge.

After the cat voids, the ripproof layer 16 and nonabsorbent litter 18 are removed, allowing for the urine be tested directly in the impermeable liner 12 or the entire impermeable liner 12 can be refrigerated and taken to the vet's office.

Alternatively, the ripproof layer 16 and the impermeable liner 14 can be bonded along the periphery of the ripproof layer 16. The urine can be removed from the bonded diagnostic pad 10 by puncturing the impermeable liner 12 and pouring the urine into a container.

Figure 2:
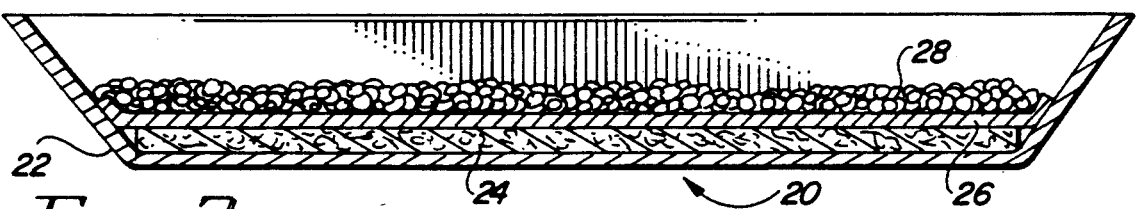
FIG. 2 is an exploded fragmentary view of an alternate pad placed in a disposable receptacle.

FIG. 2 illustrates an alternate embodiment wherein the imprevious sheet 12 of FIG. 1 is replaced by a receptacle or litter box 22. This embodiment provides an diagnostic unit in which the entire unit is disposable. The receptacle 22 can be made of water proofed cardboard, plastic coated cardboard, or a vacuum formed plastic. The spacer 24 is placed in the receptacle 22 at time of manufacture and kept in place by the ripproof layer 16 which can be sealed to the sides of the receptacle 22. The nonabsorbent litter 28 is placed on prior to use. Alternatively, the ripproof layer 26 can be manufactured oversized with adhesive strips along the edges and the unit can be assembled prior to use.

Figures 3, 4, 6:
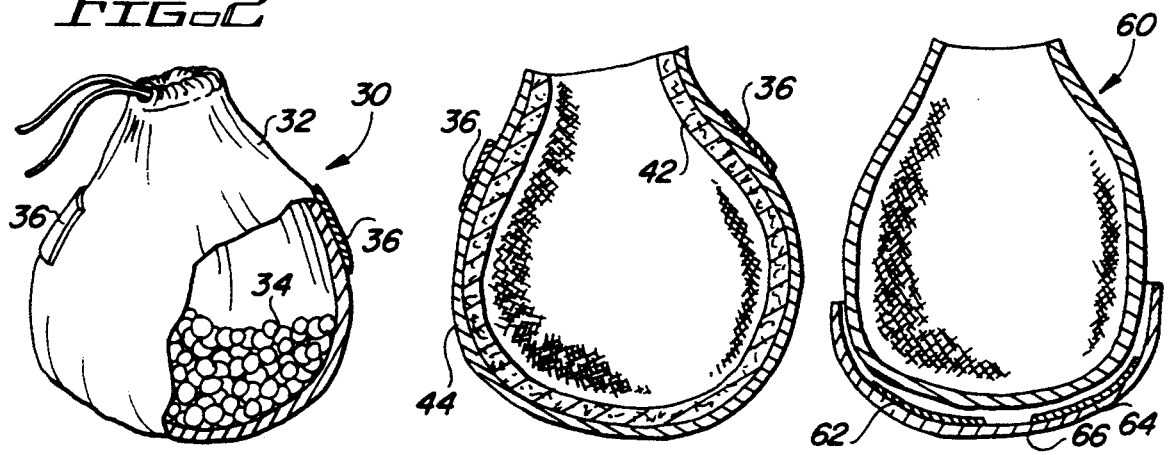
FIG. 3 is a cut away view of a ripproof bag containing the nonabsorbent litter of the instant invention.
FIG. 4 is an alternate embodiment of the ripproof bag of FIG. 3.
FIG. 6 is a further embodiment of the ripproof bag of FIG. 3.

In FIG. 3 an additional embodiment of the instant disclosure is disclosed wherein the nonabsorbent litter 34 is packaged in a bag 32 consisting of the same ripproof nonwoven known as James River Cerex 0.5 to 1.0 oz. spunbonded nylon or other similar nonwovens such as Dupont's Remay spunbonded polyester (style 2214). In FIG. 3 a drawstring bag 32 is illustrated, however this is done for simplicity as to illustrate all the various ways the bag 32 could be folded, tied and/or secured would be cumulative. The bag 32 is opened or unfolded to expose the litter and refolded after usage for ease of disposal.

Adhesive strips 36 consisting of hot melt adhesive and a wax paper overlay, as well known in the prior art, line the sides of the bag so that when it is placed in a litter box, the weight of the nonabsorbent litter 34 holds the bottom of the bag in place while the adhesive strips 36 provide for releasable attachment to the sides of the litter box. Preferably, a high loft non-woven is used as a spacer between the grit and litter box for better collection of the urine specimen while not affecting the securing design of the mass produced unit. In FIG. 4 a spacer 42 has been included as part of the bag 44, thus providing an all-in-one unit which can be easily placed in a standard litter box.

Once a cat voids design, the urine sample will be found at the bottom of the litter box once the bag 32 is lifted out. If sterilization is required, particularly when used for different cats, it can be done via gamma irradiation.

Figure 5:
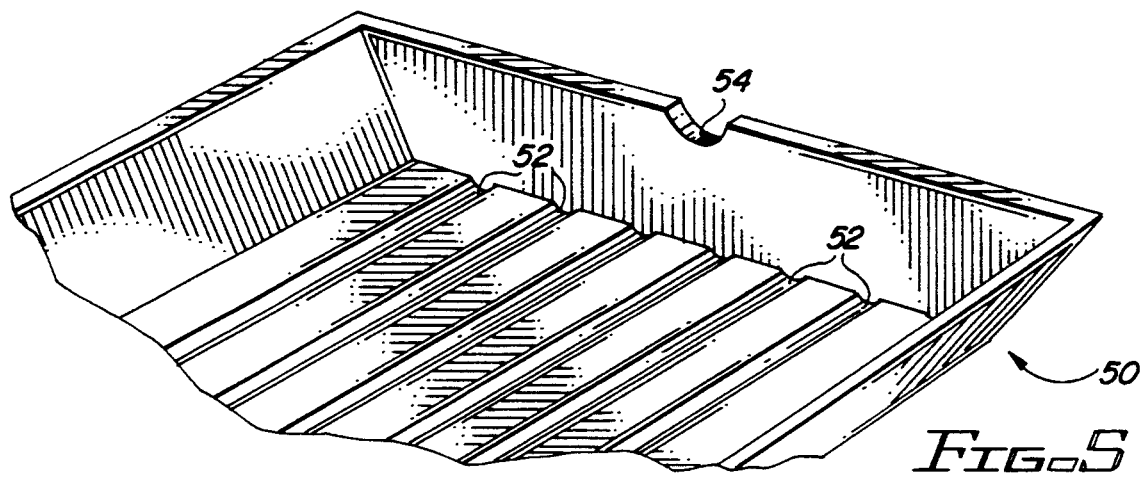
FIG. 5 is a fragmentary view of a litter box for the collection of urine.

An alternate to the above use of a standard litter box is illustrated in FIG. 5 wherein a specifically designed, inexpensive, sterile litter box 50 is provided with the bag 32. The litter box 50 is designed with chambers 52 along the bottom to catch the urine more effectively and can incorporate a pour spout 54 for easier removal of the urine. The bottom of the litter box 50 can also be manufactured with waffle, randomly depressed, etc., instead of the channels 52. Any type of depressions in the bottom can be used to collect the urine and the exact configuration would be based on manufacturing preferences. Providing pre-sterilized litter and bag along with the sterile litter box would allow for collected urine to be analyzed for pathogenic organisms. The pre-sterilized diagnostic units would also eliminate the need for veterinarians to sterilize the litter boxes after each use. The sterile litter box 50 does not need to have the rigidity of a standard litter box due to its limited use and can be sized to fit inside of a standard litter box, which would provide the rigidity. A mirror image top can be provided to facilitate pouring the urine out of the litter box 50. The bottom/snap top combinations are well known in the container art and are used extensively for store salad bars, packaging muffins, etc.

An alternative to using dip sticks, manufactured by Boehringer Mannheim and Ames Division of Miles Laboratory, under the trademarks Chemstrips and Miles Multistix, respectively, would be the use of biochemically impregnated paper. The impregnated paper can be placed in the bottom of the litter box 50 so that urine filtering down through the nonabsorbent litter and ripproof layer enters the pads. Hence the pads can be checked after each void or daily, etc., to see if the urine is acid, alkaline, contains blood, sugar, etc. The versatility of this design allows for easy individualized diagnosis as the impregnated paper can be provided for a specific individual's needs.

FIG. 6 illustrates an alternate to FIGS. 3 and 4 wherein one or two large filter paper pads 62 and 64 would be used in conjunction with, and protected by, the claw resist nonwoven bag 60. When the claw resistant bag 60 is produced the bottom is provided with an additional layer of fabric 66, open on one side, which forms a pocket into which the filter paper pads 62 and 64 are placed. When the urine passes through immediate test results would be provided. An example of the system would be filter paper pads impregnated with phenol red at a pH of 6.0 in one and Guiac Solution in the other. When urine passes through the nonabsorbent litter and the porous bag, it enters the absorbent pads. If blood is present in the urine, the pad containing the guiac solution turns blue. The pad containing the phenol red solution will give the pH of the urine. Cats with a past history of kidney stones or urinary tract blockage should have an acid urine if they are to avoid continuous problems. The absorbent pad treated with phenol red would display a yellow color for acid urine, yellow-orange for neutral and red to red-purple for alkaline urine. The presence of blood in analkaline urine could indicate crystalline formation within the cat's urinary tract.

Figure 7:
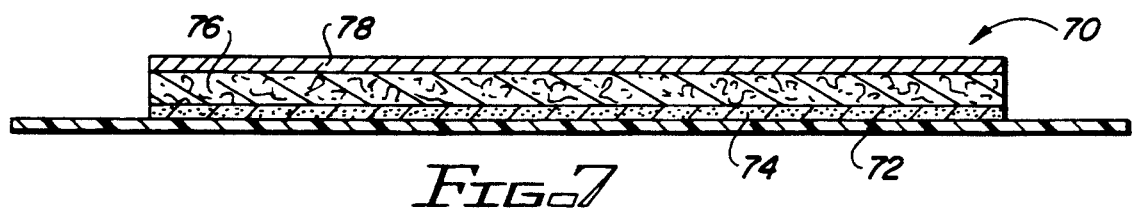
FIG. 7 is an exploded fragmentary view of an alternate embodiment of the diagnostic pad.

A further embodiment is disclosed in FIG. 7 wherein an absorbent layer 74 is placed between the impervious layer 72 and the spacer 76. The absorbent layer 74 is similar to the biochemically impregnated card as described above, and is overlaid by the optional spacer 76 and the ripproof layer 78, as describe in FIG. 1. The absorbent layer 74 is an absorbent non-woven or paper material which has been treated with the proper indicators of blood, pH, etc. As an alternative, the treated absorbent layer 74 can be replaced with a non-treated absorbent white pad for those not wishing to use an occult blood test, simply knowing that they should observe the white pad for blood stains is enough to guarantee that health problems associated with the aforementioned can be immediately recognized and treated. In an alternate embodiment to FIG. 7, only the top three layers would be used and the urine would collect directly into the sterile litter box.

The embodiment of FIGS. 6 and 7 allow for rapid observation of pH, blood, etc., while using an existing litter box. It should be understood that the absorbent layer is not equivalent in function or purpose to that of absorbent litter. In the instant embodiment, the absorbent layer serves as a medium for the diagnostic reagents.

The absorbent paper pads can be impregnated with other chemicals for detecting Glucose, Albumen (Protein) ketones, etc., and used in the urine collecting litter box in place of the pH or blood detecting pads. Optionally, all reagents can be combined within one large absorbent pad for simultaneously running of a plurality of different tests.

An alternate means of immediate diagnostic determination can be made by use of the diagnostic pad or diagnostic units described above, wherein after the cat voids biochemical reagents in liquid form would be added directly to the top layer of the liner. The colors would develop and give visible evidence to the pH of the urine, blood, etc.

What is claimed is:

1. A method of collecting urine from an animal for use in diagnostic testing, the method comprising the steps of:

a) placing a urine collecting member in an animal accessible location, said urine collecting member including a claw proof member and a moisture impermeable member, b) attracting the animal to the urine collecting member utilizing a plurality of inert, non-absorbent particles, said non-absorbent particles having a sufficiently high density and hydrophobicity to resist scattering and clinging to a foot of the animal and having an average particle size of at least a sufficiently large diameter to provide sufficient interparticle spacing to permit a free flow of urine through said non-absorbent particles, and wherein said non-absorbent particles are substantially free of filler particles which fill spaces between adjacent ones of said non-absorbent particles so as to inhibit urine flow to said urine collecting member, c) collecting urine which flows through said non-absorbent particles on said moisture impermeable member, d) isolating at least a portion of the urine collected on said moisture impermeable member, and e) performing a diagnostic test on the isolated portion of the urine.

2. A method as recited in claim 1 wherein the step of placing said urine collecting member in an animal accessible location further includes placing said urine collecting member having a disposable receptacle, in an animal accessible location, and containing said non-absorbent particles in said disposable receptacle of said urine collecting member.

3. A method as recited in claim 1 wherein the step of placing said urine collecting member in an animal accessible location further includes placing said urine collecting member having a spacer member disposed between said claw proof member, which is structured to allow the passage of the urine therethrough, and said moisture impermeable material, in an animal accessible location.

4. A method as recited in claim 1 wherein the step of attracting the animal to the urine collecting member utilizing a plurality of inert, non-absorbent particles further includes attracting the animal to the urine collecting member utilizing a plurality of inert, non-absorbent particles which are coarse and have an average particle size greater than about one millimeter.

5. A method of collecting animal urine and conducting diagnostic tests thereon, the method comprising the steps of:

a) placing a urine collecting member in an animal accessible location, said urine collecting member including
i) a claw proof member,
ii) a moisture impermeable member, and
iii a plurality of substantially inert, non-absorbent granular particles, said granular particles overlying said claw proof member, being substantially inert with respect to the urine, and having an average particle size of at least a sufficiently large diameter to provide sufficient interparticle spacing to permit a free flow/transfer of urine from said granular particles to said moisture impermeable member and wherein said granular particles are substantially free of filler particles which fill spaces between adjacent ones of said granular particles so as to inhibit urine flow between said granular particles, b) collecting the urine on said moisture impermeable member, c) separating at least a portion of the urine collected from said moisture impermeable member, and d) testing the urine with at least one diagnostically active chemical reagent.

6. A method as recited in claim 5 wherein the step of placing said urine collecting member in an animal accessible location further includes placing said urine collection member having a spacer member between said claw proof member and said moisture impermeable member so as to function as a urine collection region, in the animal accessible location.

7. A method as recited in claim 5 wherein the step of placing said urine collecting member in an animal accessible location further includes placing said urine collection member including non-absorbent granular particles having an average particle size greater than approximately one millimeter and a specific gravity of less than about 1.5, in the animal accessible location.

8. A method as recited in claim 5 wherein the step of placing said urine collecting member in an animal accessible location further includes placing said urine collection member including a plurality of inert, non-absorbent granular particles having an average particle size in the range of about two millimeters to about one centimeter and an average weight of at least about 100 pounds per cubic foot, and a specific gravity greater than about 1.5, in the animal accessible location.

9. A method as recited in claim 8 wherein the step of placing said urine collecting member in an animal accessible location further includes placing said urine collecting member including a plurality of substantially inert, non-absorbent granular particles with an inert hydrophobic coating, in the animal accessible location.

10. A method as recited in claim 5 wherein the step of placing said urine collecting member in an animal accessible location further includes placing said urine collecting member including a plurality of substantially inert, non-absorbent granular particles which are of a sufficient size, density, and hydrophobicity to resist wetting by urine and cling to the feet of animals, and to provide for essentially unrestricted flow of urine past said granular particles, in the animal accessible location.

11. A method as recited in claim 5 wherein the step of placing said urine collecting member in an animal accessible location further includes placing said urine collection member including a claw proof member which is a spacer means for collecting and retaining urine on said moisture impermeable member, in said animal accessible location.

12. A method as recited in claim 5 wherein the step of placing said urine collecting member in an animal accessible location further includes placing said urine collecting member including a claw proof member having a claw proof non-woven top sheet and a spacer member between said top sheet and said moisture impermeable member such that said spacer member provides a region for collecting and retaining urine, in the animal accessible location.

13. A method as recited in claim 5 wherein the step of placing said urine collecting member in an animal accessible location further includes placing said urine collecting member including a plurality of substantially inert, non-absorbent granular particles which are coarse and have an average particle size greater than about one millimeter, in the animal accessible location.

14. A method as recited in claim 13 wherein the step of placing said urine collecting member in an animal accessible location further includes placing said urine collecting member including a plurality of substantially inert, non-absorbent granular particles having a hydrophobic coating in the animal accessible location.

15. A method as recited in claim 5 wherein the step of placing said urine collecting member in an animal accessible location further includes placing said urine collecting member including a plurality of substantially inert, non-absorbent granular particles having a sufficient size, density, and hydrophobicity to resist wetting by urine and clinging to the feet of animals, and to provide for essentially unrestricted flow of urine passed the granular particles, in the animal accessible location.

* * * * *